United States Patent [19]

Jardin et al.

[11] 4,165,120

[45] Aug. 21, 1979

[54] VEHICLE ROOF

[75] Inventors: Hans Jardin, Inning; Wolfgang Rottenfusser, Hanfeld; Karl-Heinz Isleif, Percha, all of Fed. Rep. of Germany

[73] Assignee: Webasto-Werk W. Baier GmbH & Co., Fed. Rep. of Germany

[21] Appl. No.: 847,910

[22] Filed: Nov. 2, 1977

[30] Foreign Application Priority Data

Nov. 13, 1976 [DE] Fed. Rep. of Germany ... 7635933[U]

[51] Int. Cl.² .............................................. B60J 7/18
[52] U.S. Cl. ................................................ 296/137 J
[58] Field of Search ............... 296/137 B, 148, 137 J, 296/137 D, 137 E, 137 F, 137 C; 49/465; 98/2.12–2.15

[56] References Cited

U.S. PATENT DOCUMENTS

| 3,156,175 | 11/1964 | Werner | 98/2.14 |
| 3,311,406 | 3/1967 | Fritsch | 296/137 J |
| 3,913,971 | 10/1975 | Green | 49/465 X |
| 3,955,848 | 5/1976 | Lutz et al. | 98/2.14 X |

FOREIGN PATENT DOCUMENTS

| 546148 | 10/1959 | Belgium | 296/137 B |
| 1250749 | 9/1967 | Fed. Rep. of Germany | 296/137 J |
| 2644848 | 4/1977 | Fed. Rep. of Germany | 296/137 J |

Primary Examiner—Joseph F. Peters, Jr.
Assistant Examiner—Norman L. Stack, Jr.
Attorney, Agent, or Firm—Craig and Antonelli

[57] ABSTRACT

Passenger vehicle roof structure is provided which includes an opening, a tiltable cover member for selectively closing the opening, and a wind deflector which is separate from the cover member and which is attachable at the forward end of the opening when the cover member is removed. In order to accommodate ready exchange of the tiltable cover member and the wind deflector, with a minimum of structural parts, each of the wind deflector and cover member is provided with a pair of plug-in elements which in turn are detachably connectable in corresponding mating plug-in elements fixed at the forward end of the opening. In particularly preferred embodiments, the wind deflectors are provided with resiliently biased safety clip structures for retaining the wind deflector in the attached position, especially in opposition to forces experienced during vehicle braking.

12 Claims, 6 Drawing Figures

VEHICLE ROOF

BACKGROUND AND SUMMARY OF THE INVENTION

The increasingly strict legislation governing internal safety of motor vehicles has resulted in a situation in which convertibles are no longer allowed to be built in certain countries. In order to meet the desires of the public for as much fresh air as possible and an unimpeded view during good weather, more and more vehicles are being built with sun roofs. In the case of vehicles in which the size of the roof is insufficient to allow installation of a sliding roof as well as vehicles in lower price categories in which the cost of a sun roof is relatively high relative to the total cost of the vehicle, tilting covers are known which in recent models can also be removed from the vehicles, in order to offer the passengers a free roof opening which is the same as that in vehicles equipped with sliding roofs when the latter are slid back. A disadvantage of this type of roof is that above a certain speed unpleasant wind noise and suction are produced. The wind deflectors which are known on sliding roofs, firmly installed and folding automatically when the sliding roof is closed, cannot be used on vehicle roofs with removable covers, since the hinge connection between the leading edge of the cover and roof frame leaves no space to install such a wind deflector. Wind deflectors mounted on the roof likewise cannot be used because they prevent removal of the cover.

The invention contemplates providing a vehicle body panel member such as a vehicle roof with a cover removably mounted within a roof opening, the rear end of said cover being swivellable upward out of the opening, and has the purpose of allowing a largely suction-free and noise-free ventilation of the interior of the vehicle when the cover is removed.

This goal is achieved according to the invention by virtue of the fact that receiving elements, preferably at least two receiving elements, are mounted in the forward part of a frame surrounding a roof opening, said receiving elements serving for optional releasable fastening of the cover or of a wind deflector, whereby the cover and the wind deflector are provided with plug-in elements which correspond position-wise and can be removed from the receiving elements.

The proposal according to the invention therefore makes it possible, after removing the cover, to insert a wind deflector in the same receiving elements, whereby a suction-free and noise-free ventilation is provided without any additional fastening elements having to be provided on the vehicle itself for the wind deflector.

Although the plug-in elements and the receiving elements are to be designed so that inadvertent release of the cover and/or wind deflector through human error cannot occur, it is advantageous, according to another feature of preferred embodiments of the invention, to provide additional safety devices which must first be unlocked manually before the wind deflector and/or cover may be removed.

In embodiments where the receiving elements are formed of inserts disposed in slots in a vertical front wall of a forward part of the frame surrounding the opening, said inserts projecting backward from the vertical wall, the wind deflector and/or cover are preferably provided on their respective underside with a swivellable safety clip for each insert, said clip fitting beneath the projecting part of the insert when the wind deflector or cover is inserted. Preferably, the safety clip is subject to the action of a spring, which tends to keep the safety clip in its locked position. By swivelling the clip against the force of the spring, the safety clip can be freed from the insert, so that the wind deflector and/or cover can be pulled out of the receiving elements.

Alternatively, a swivellable clip may be provided on the wind deflector according to other preferred embodiments, said clip being lockable in a slot located essentially horizontally in a strip mounted on the frame. Preferably, the slit extends forward from the rear edge of the strip, whereby its forward end is located higher than its beginning. In this manner, the clip can be pulled out of the slot only when the wind deflector is pressed downward. When the vehicle is braked, on the other hand, forces act upon the wind deflector which tend to move it in the opposite direction, namely forward. In this direction of movement, however, the wind deflector is held securely by the safety clip.

These and other objects, features and advantages of the present invention will become more apparent from the following description when taken in connection with the accompanying drawings, which show, for purposes of illustration only, several embodiments in accordance with the present invention.

DETAILED DESCRIPTION OF THE DRAWINGS

Figure 1:
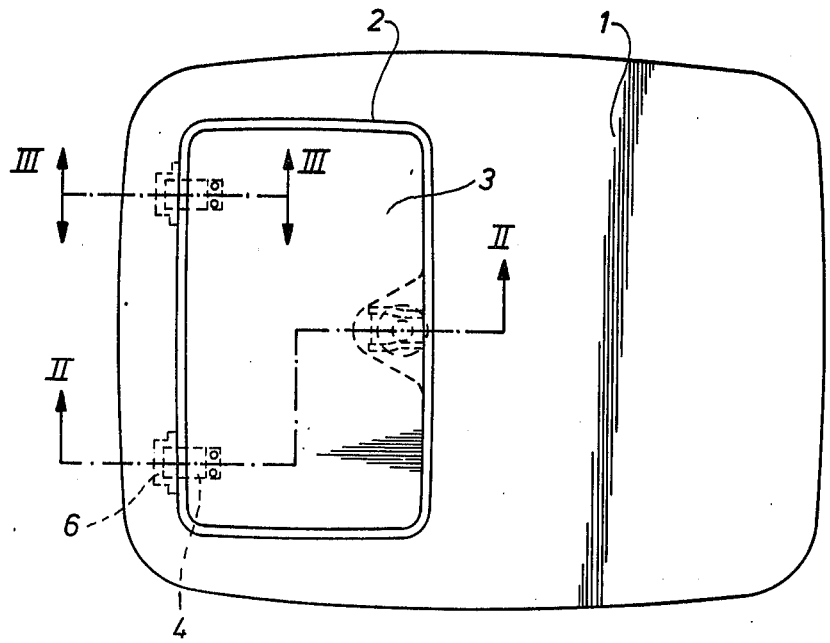
FIG. 1 is a schematic top view of a vehicle roof equipped with apparatus constructed in accordance with the present invention.
Figure 2:
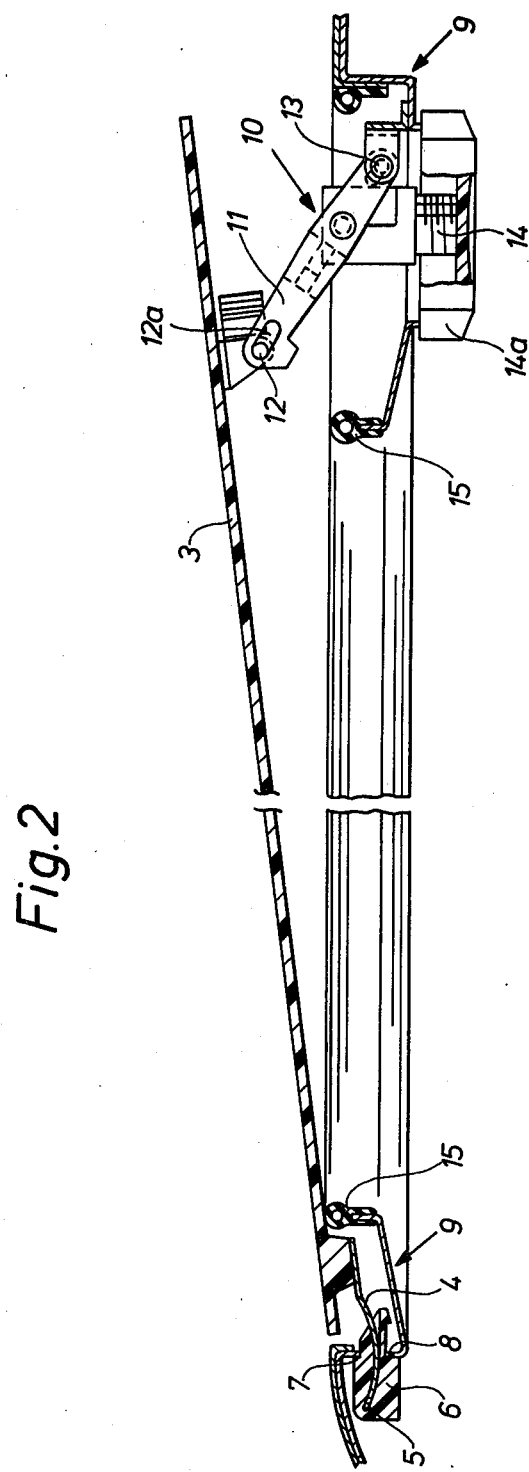
FIG. 2 is a cross sectional view along Line II—II in FIG. 1.

In FIG. 1, 1 represents a vehicle roof, provided with a rectangular roof opening 2, said opening being closable by a cover 3. As shown particularly in FIG. 2, cover 3 is provided in the vicinity of its forward edge with curved plug-in elements 4, which fit into correspondingly curved slots 5 of inserts 6, which inserts 6 are inserted in respective slots 7 in the vertical wall 8 of a frame 9 which fits around roof opening 2 and is designed as a rain gutter. Near its rear end, the cover 3 is provided with a tilting mechanism 10, provided with a lever 11, which is mounted at one end by means of a pin 12 and a slot 12a rotatably and lengthwise-displaceably on cover 3 and at the other end is mounted rotatably at 13 on frame 9. In order to swivel lever 11, a telescoping thread 14 is used, said thread being rotatable by means of a handwheel 14a rotatably mounted on frame 9, in order to tilt cover 3, as shown in FIG. 2, or to return it to its closed position, whereby cover 3 is pivoted around the effective pivot axis formed by the curved plug-in elements 4 and the slot 5 cooperating with them. Cover 3 can also be removed completely, for which purpose pin 12 is pulled out of slot 12a, whereby cover 3 can be swiveled further upward (rear end upward) until its plug-in elements 4 may be easily slidably withdrawn from slots 5. The number 15 represents a seal surrounding rain gutter 9, said seal 15 resting against the underside of cover 3 in a sealing manner when the latter is closed.

Figure 3:
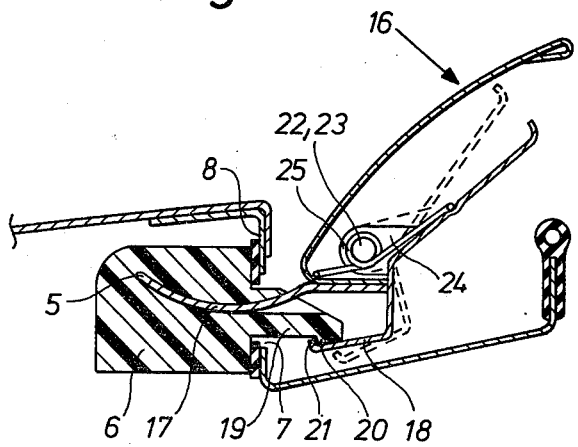
FIG. 3 is a sectional view along Line III—III in FIG. 1 wherein a wind deflector instead of a cover has been inserted in the receiving elements on the frame.
Figure 4:
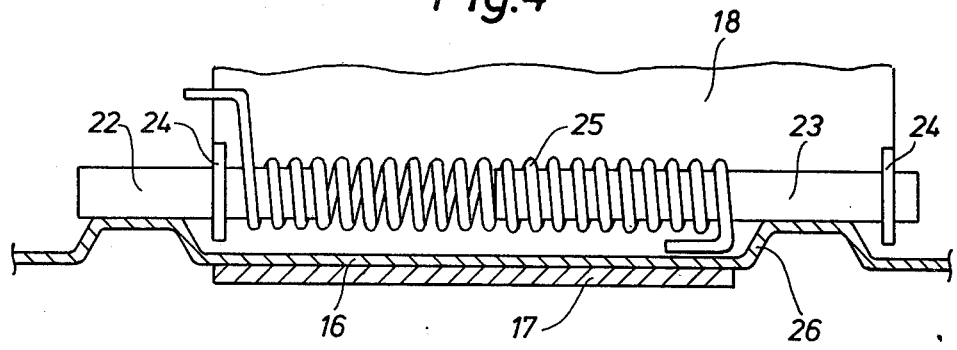
FIG. 4 is an enlarged view showing a detail of the wind deflector in FIG. 3.

In order to permit suction-free and low-noise ventilation of the vehicle interior when cover 3 is removed, a wind deflector 16 (FIG. 3) is provided, said deflector 16 being provided with plug-in elements 17, said elements 17 being identical to plug-in elements 4 on cover 3 and being slidably insertable in the curved slot 5 in the receiving inserts 6. In order to prevent wind deflector 16 from inadvertently coming loose, especially when the vehicle is braked, the wind deflector is provided at least in the vicinity of one plug-in element 17 with a swivellable safety clip 18, said clip 18 fitting beneath a part 19 of element 6 which extends backward from wall 8 when wind deflector 16 is inserted. The underside of part 19 is provided for this purpose with a rib 20, behind which rib 20 the curved end 21 of safety clip 18 fits. The rotatable mounting of safety clip 18 on wind deflector 16 is accomplished by means of two bolts 22 and 23 aligned with one another, which are fastened on wind deflector 16 and can be slid onto bracket 20 which is fastened on safety clip 18. (See FIGS. 3 and 4.) A torsion spring 25, fastened at one end to the wind deflector and at the other end to safety clip 18 and sliding on bolts 22, 23 tends to press safety clip 18 into the locked position, as shown by the solid lines in FIG. 3. Spring 25, by resting against a projection 26 on wind deflector 16, is prevented from being displaced toward the right in FIG. 4, whereby safety clip 18 is simultaneously immobilized. If the safety clip is swiveled by thumb pressure against the action of spring 25 into the position shown in FIG. 3 by dot-dashed lines, its hook 21 comes free from rib 20 and wind deflector 16 can be pulled out of slots 5 of the receiving element.

Figure 5:
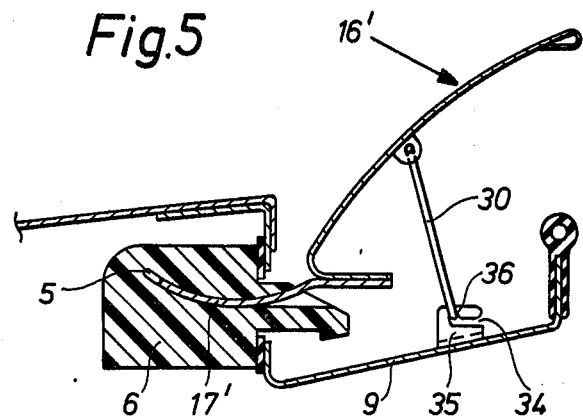
FIG. 5 is a cross sectional view similar to FIG. 3 but with a wind deflector of a different design.
Figure 6:
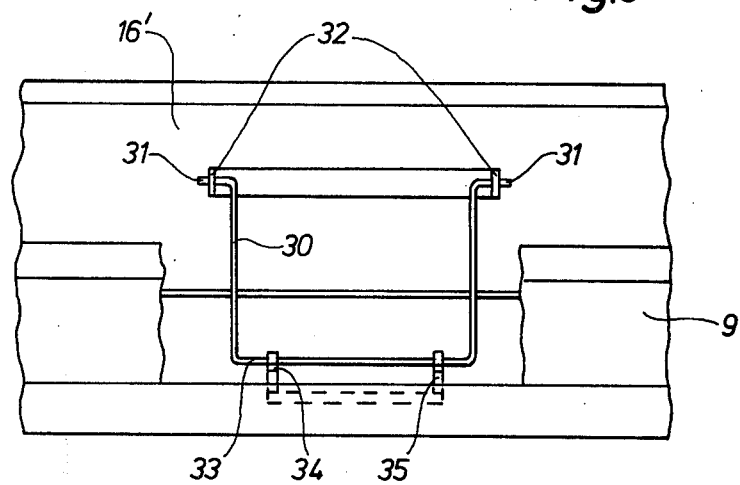
FIG. 6 is a view of the wind deflector shown in FIG. 5 from the right, with a portion of the rain gutter cut away.

In the embodiment shown in FIGS. 5 and 6, a clip or hook arrangement 30 is provided on the rear of wind deflector 16', said clip 30 having its curved end portions 31 extended through openings in a bracket 32 mounted on wind deflector 16', and being capable of having its central section 33 mesh with slots 34, said slots 34 being provided on strips 35 mounted on frame 9. As shown in FIG. 5, slot 34 extends approximately horizontally forward from the rear edge of strip 35, and is provided at its forward end with an upwardly extending section 36, into which clip 30 locks under tension. Wind deflector 16', as in the previous embodiment, is provided with bent plug-in element 17', which is insertable in the slots 5 in receiving elements 6. Wind deflector 16' and clip 30 are designed so that after plug-in elements 17' are inserted in slots 5, wind deflector 16' must be pushed slightly downward in order to allow central part 33 of clip 30 to enter slot 34 (deflector 16' and elements 17' being resiliently biased toward a position above the position corresponding to locking of clip 30). Clip 30 is therefore held under tension in the upwardly extending strip 35 of slot 34.

It should be pointed out that the present invention also contemplates embodiments with safety clips, corresponding to safety clips 18 and 30 as shown, provided on cover 3 as well.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

We claim:

1. Vehicle body apparatus comprising:
   vehicle body panel means,
   an opening formed in said body panel means,
   receiving element means disposed adjacent said opening,
   a cover member for selectively closing said opening,
   a wind deflector which is separate from said cover member and which is attachable at said body panel means adjacent said opening,
   wherein each of said cover member and said wind deflector is provided with similarly configured plug-in elements, said plug-in elements being releasably connectible with mating plug-in elements of said receiving element means to accommodate easy interchangeability and optional utilization of said cover member and said wind deflector in conjunction with said opening, and
   safety means secured to the underside of at least one of said cover member and wind deflector for preventing inadvertent detachment thereof, said safety means being detachably fastenable to said receiving element means in a manner enabling easy connection and disconnection thereof.

2. Apparatus according to claim 1, wherein said vehicle body panel means forms at least part of a roof for a vehicle passenger space.

3. Apparatus according to claim 2, wherein tilting means are provided for adjustably tilting the rear of said cover member about a forwardly disposed axis formed at the releasable connection of said receiving element means and said plug-in elements, and wherein said receiving element means includes two separate spaced receiving elements.

4. Apparatus according to claim 3, wherein a frame is provided around said opening, said frame being fixedly disposed with respect to adjacent body panel means structure and including a vertical front wall extending adjacent a forward edge of said opening, wherein said receiving element means are formed as a plurality of separate inserts disposed in said front wall, said inserts projecting rearwardly from said front wall.

5. Apparatus according to claim 4, wherein said safety means comprises a swivelable safety clip which is detachably engageable with a portion of one of said inserts.

6. Apparatus according to claim 5, wherein said portion of said one of said inserts is a downward projection located at the rear of said insert, said projection being detachably gripped by a hook mounted on the end of the safety clip.

7. Apparatus according to claim 4, wherein said safety means is under the influence of a spring which biases said safety clip toward a locked position.

8. Apparatus according to claim 1, wherein said safety means comprises a swivellable safety clip serving to prevent inadvertent detachment of said plug-in elements.

9. Apparatus according to claim 8, wherein said safety clip is spring biased into a locking position holding said one of said cover member and wind deflector in position at said opening, and wherein manually engageable means are provided for simply manually pushing said safety clip away from its locking position to accommodate removal of said one of said wind deflector and cover member from said opening.

10. Apparatus according to claim 8, wherein said safety clip is provided on the wind deflector, said safety clip being lockable in an essentially horizontal slot in a strip mounted on a frame part of the body structure.

11. Apparatus according to claim 10, wherein said slot extends approximately horizontally forward from the rear edge of the strip and extends upward in its forward end section.

12. Apparatus according to claim 9, wherein said safety clip is spring biased into said locking position by a spiral spring mounted at said wind deflector.

* * * * *